(12) United States Patent
Nam et al.

(10) Patent No.: US 11,105,397 B2
(45) Date of Patent: Aug. 31, 2021

(54) GEAR MODULE COMPRISING TWO-POINT CONTACT INTERNAL GEAR

(71) Applicant: ROBOTIS CO., LTD., Seoul (KR)

(72) Inventors: Hyoung Chul Nam, Seoul (KR); Byoung Soo Kim, Seoul (KR); Wook Jang, Gwangmyeong-si (KR)

(73) Assignee: ROBOTIS CO., LTD., Seoul (KR)

( * ) Notice: Subject to any disclaimer, the term of this patent is extended or adjusted under 35 U.S.C. 154(b) by 0 days.

(21) Appl. No.: 17/053,176

(22) PCT Filed: May 15, 2018

(86) PCT No.: PCT/KR2018/005572
§ 371 (c)(1),
(2) Date: Nov. 5, 2020

(87) PCT Pub. No.: WO2019/221310
PCT Pub. Date: Nov. 21, 2019

(65) Prior Publication Data
US 2021/0164541 A1  Jun. 3, 2021

(30) Foreign Application Priority Data
May 15, 2018  (KR) .......................... 10-2018-0055276

(51) Int. Cl.
*F16H 1/32* (2006.01)
(52) U.S. Cl.
CPC ...................... *F16H 1/32* (2013.01)
(58) Field of Classification Search
CPC ............ F16H 1/32; F16H 2001/322–2001/328
USPC ........................................................ 475/168
See application file for complete search history.

(56) References Cited

U.S. PATENT DOCUMENTS 10,161,480 B2 * 12/2018 Hsieh ........................ F16H 1/32

FOREIGN PATENT DOCUMENTS

| JP | 61-244940 A | 10/1986 | |
|---|---|---|---|
| JP | 06-74303 A | 3/1994 | |
| JP | 2004-301274 A | 10/2004 | |
| JP | 2008174213 A * | 7/2008 | ............. B62D 5/008 |
| JP | 2010-164088 A | 7/2010 | |
| JP | 2010164088 A * | 7/2010 | ............. F16H 55/10 |
| KR | 10-2009-0057675 A | 6/2009 | |
| WO | WO-03067124 A1 * | 8/2003 | ............... F16H 1/32 |

* cited by examiner

*Primary Examiner* — Sherry L Estremsky
(74) *Attorney, Agent, or Firm* — Novick, Kim & Lee, PLLC; Jae Youn Kim; Jihun Kim

(57) ABSTRACT

A gear module includes: an external gear eccentrically rotating and having a plurality of teeth formed along an outer peripheral surface thereof; and an internal gear having a plurality of grooves formed along an inner peripheral surface thereof, wherein each groove and each pin come into contact with each other with two contact points, and each groove is formed concavely from an overlapping portion between a first circular sector having a first curvature radius $r_1$ larger than a curvature radius of each pin and a first circular arc coming into contact with one contact point and a second circular sector having a second curvature radius larger than the curvature radius of each pin and a second circular arc coming into contact with another contact point, the first curvature radius and the second curvature radius passing through a center point of each pin and having the same size as each other.

5 Claims, 7 Drawing Sheets

$r_p = r_1, r_2$ $r_p < r_1, r_2 < \infty$ $r_1, r_2 = \infty$

GEAR MODULE COMPRISING TWO-POINT CONTACT INTERNAL GEAR

TECHNICAL FIELD

The present invention relates to a gear module having a two-point contact internal gear, and more particularly, to a gear module that is applicable to a speed reducer.

BACKGROUND ART

A speed reducer is a device that reduces a high-speed rotating force received from a power unit to a given ratio through a gear arrangement to thus output a low-speed rotating force, which is used in various fields.

A high-precision speed reducer is used in particular in a field where precise driving control is required, such as an industrial robot, humanoid robot, and so on, and the high-precision speed reducer has to have higher reduction ratio and repetition precision than a general speed reducer.

There is a cycloid reducer as the high-precision speed reducer widely used at present. The cycloid reducer is provided with a gear module that includes an internal gear 12' having grooves formed along an inner peripheral surface thereof in such a manner as to allow pins 120' to be coupled to the grooves and an external gear 11' eccentrically rotating in such a manner as to engage with the pins 120', so that it can provide various reduction ratios.

In this case, as shown in FIG. 1, each groove of the internal gear 12' has to uniformly come into surface contact with the corresponding pin 120', but actually, the groove and the pin come into contact with each other on one contact point because of machining and assembly tolerance, so that a direction of a load applied from the external gear 11' may be different from a direction of repulsion of the contact point. Accordingly, the speed reducer to which the conventional gear module is applied is configured to allow load and stress to be collected to one contact point, thereby undesirably accelerating wear, and also to cause the load direction to be different from the repulsion direction, thereby undesirably resulting in the decrease of performance thereof.

In the conventional gear module, further, there is no space between the internal gear 12' and each pin 120' to accommodate a lubricant therein, thereby making it impossible to provide a lubricating film therebetween. Accordingly, fine particles generated from wear may remain on their frictional surface, thereby causing increase of frictional heat and surface damages.

In the conventional gear module, furthermore, one or more contact points are formed according to the surface roughness of the internal gear 12', and degrees of friction generated from the respective contact points are different from each other, thereby causing inhibition with the rotations of the pins 120'.

Accordingly, there is a need to develop a new gear module capable of distributing loads of pins to thus improve durability thereof and optimizing rotating forces of the pins.

DISCLOSURE

Technical Problem

Accordingly, the present invention has been made to solve the above-mentioned problems, and it is an object of the present invention to provide a gear module that is capable of distributing loads of pins to thus improve durability thereof and optimizing rotating forces of the pins.

The technical problems to be achieved through the present invention are not limited as mentioned above, and other technical problems not mentioned herein will be obviously understood by one of ordinary skill in the art through the following description.

Technical Solution

To accomplish the above-mentioned object, according to the present invention, there is provided a gear module including: an external gear eccentrically rotating and having a plurality of teeth formed along an outer peripheral surface thereof; and an internal gear having a plurality of grooves formed along an inner peripheral surface thereof in such a manner as to allow pins to be located in the plurality of grooves and thus to come into contact with the external gear, wherein each groove and each pin come into contact with each other with two contact points, and each groove is formed concavely from an overlapping portion between a first circular sector having a first curvature radius $r_1$ larger than a curvature radius of each pin and a first circular arc coming into contact with one contact point and a second circular sector having a second curvature radius larger than the curvature radius of each pin and a second circular arc coming into contact with another contact point, the first curvature radius and the second curvature radius passing through a center point of each pin in such a manner as to be connected to the respective contact points and having the same size as each other.

According to the present invention, desirably, an angle formed by two straight lines connecting the contact points to the center point of the pin is greater than or equal to an angle formed by two straight lines connecting boundary points of an effective contact range between the external gear and the pin to the center point of the pin.

According to the present invention, desirably, each groove is formed to the shape of a curved or straight line.

According to the present invention, desirably, through the formation of the groove, a space portion is formed between the pin and the groove, and the space portion has a lubricant accommodated thereinto.

According to the present invention, desirably, the contact points and the angle formed by the two straight lines connecting the contact points to the center point of the pin are determined according to a user's selection.

Advantageous Effects

According to the present invention, the gear module is configured to allow each pin to come into contact with each groove of the internal gear on two points. Through the two-point contact between the pin and the groove, the load of the pin can be distributed to the two points as fixed positions, irrespective of the direction of load applied from the external gear, and a lubricating film is formed between the pin and the groove of the internal gear to prevent the internal gear from being damaged, thereby improving performance of a speed reducer if the gear module is applied to the speed reducer.

The effects of the invention are not limited as mentioned above, and it should be understood that the effects of the invention include all effects inferable from the detailed description and claims of the present invention.

BEST MODE FOR INVENTION

Figure 1:
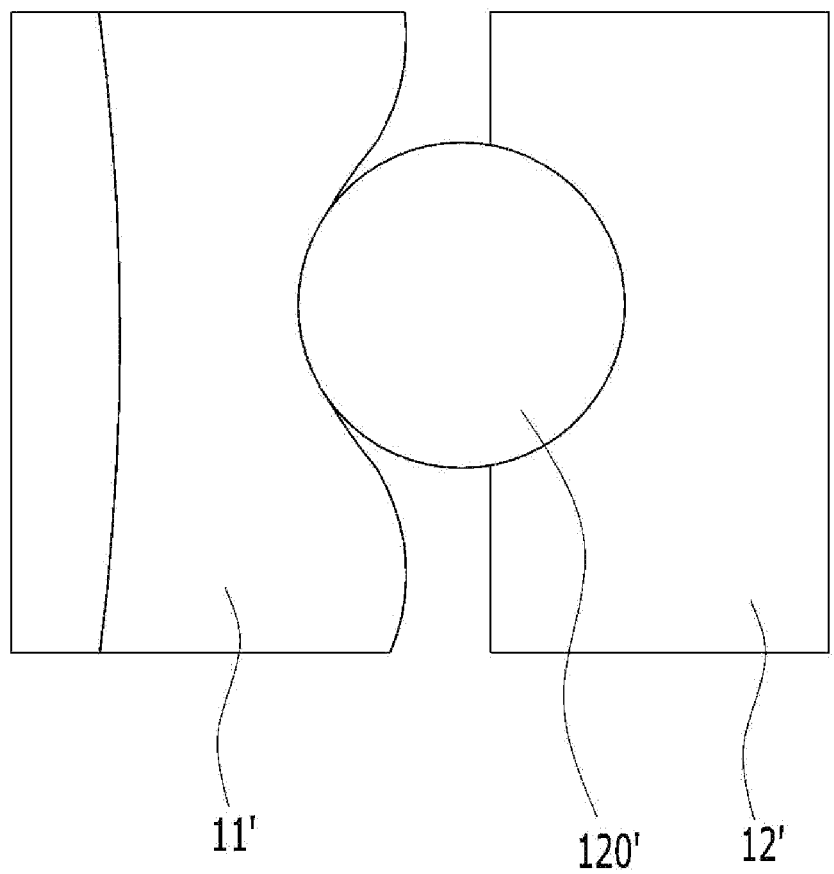
FIG. 1 is a view showing a portion of a conventional gear module.

Hereinafter, the present invention will now be described in detail with reference to the attached drawings. Before the present invention is disclosed and described, the disclosed embodiments are merely exemplary of the invention, and the present invention is not limited thereto. The corresponding parts in the drawings are indicated by corresponding reference numerals.

In the description, when it is said that one element is described as being "connected" or "coupled" to the other element, one element may be directly connected or coupled to the other element, but it should be understood that another element may be present between the two elements. When it is said that one portion is described as "includes" any component, further, one element further may include other components unless no specific description is suggested.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Figure 2:
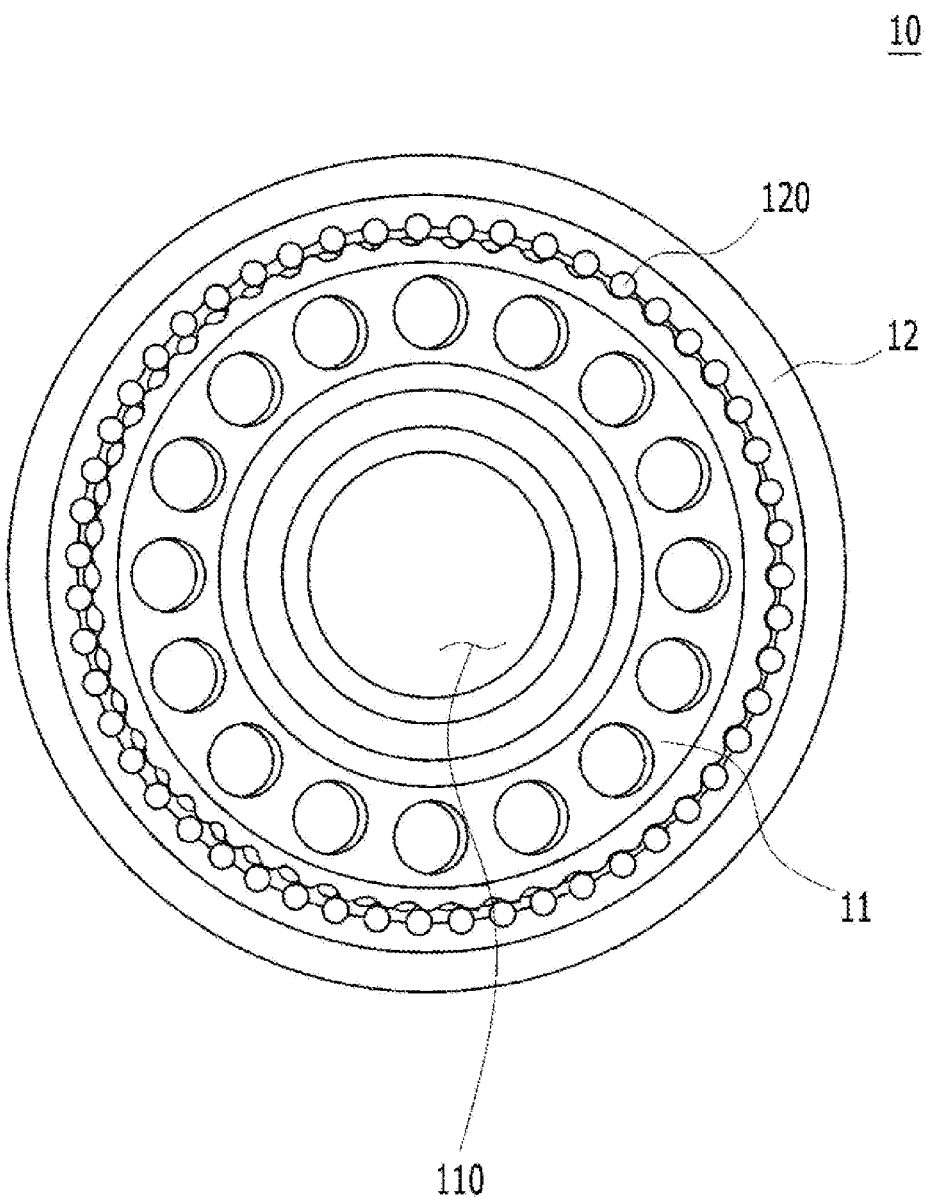
FIG. 2 is a plan view showing a gear module according to the present invention.
Figure 3:
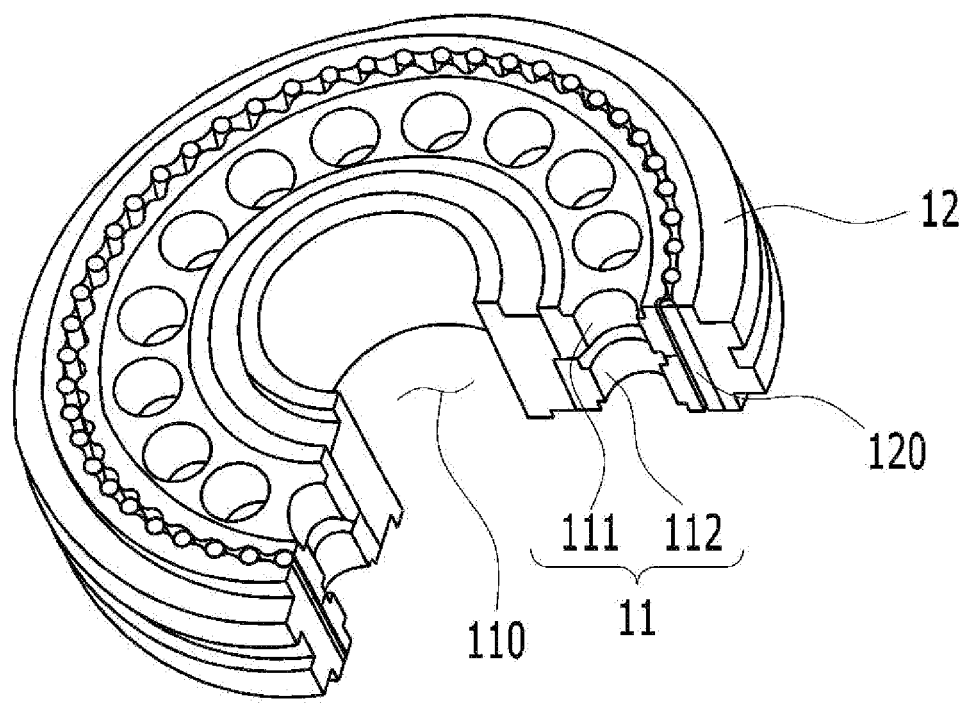
FIG. 3 is a perspective view showing the gear module of FIG. 2, wherein a portion thereof is cut.

FIG. 2 is a plan view showing a gear module 10 according to the present invention, and FIG. 3 is a perspective view showing the gear module 10 of FIG. 2, wherein a portion thereof is cut.

The gear module 10 according to the present invention includes an external gear 11 and an internal gear 12. In this case, the external gear 11 is fitted to a through hole formed at the center of the internal gear 12.

The external gear 11 is a circular plate-shaped gear having teeth formed along an outer peripheral surface thereof and a through hole 110 formed at the center thereof, and further, the external gear 11 includes a pair of gears having the same size as each other in such a manner as to have an eccentric contact with each other.

In detail, the external gear 11 includes a first plate gear 111 rotatably fixed to a first eccentric body 22 (See FIG. 7) spaced apart by a given distance from a rotating shaft in a first direction with respect to the rotating shaft, coming into contact with pins 120, and performing speed reduction by a teeth number difference from the internal gear 12, and a second plate gear 112 rotatably fixed to a second eccentric body 23 (See FIG. 7) spaced apart from the rotating shaft by a given distance in a second direction opposite to the first direction. In this case, the first plate gear 111 and the second plate gear 112 have trochoidal teeth profiles, epitrochoidal teeth profiles, circular arc teeth profile, and so on.

The internal gear 12 has the through hole adapted to insert the external gear 11 thereinto and a plurality of grooves 121 formed along an inner peripheral surface thereof in such a manner as to couple the pins 120 coming into contact with the external gear 11 thereto. In this case, each groove 121 of the internal gear 12 can come into contact with the corresponding pin 120 through two contact points. Further, the internal gear 12 and the pins 120 may be formed unitarily with each other.

The number of pins 120 is larger by one than the number of teeth of the external gear 11. Accordingly, the external gear 11 rotates in a state of being misaligned with the internal gear 12 by the teeth number difference from the internal gear 12 whenever one rotation is carried out. For example, if it is assumed that the number of teeth of the external gear 11 is N and the number of pins 120 is N+1, the external gear 11 rotates while being reduced to a reduction ratio of 1/N with respect to the number of rotations inputted.

Figure 4:
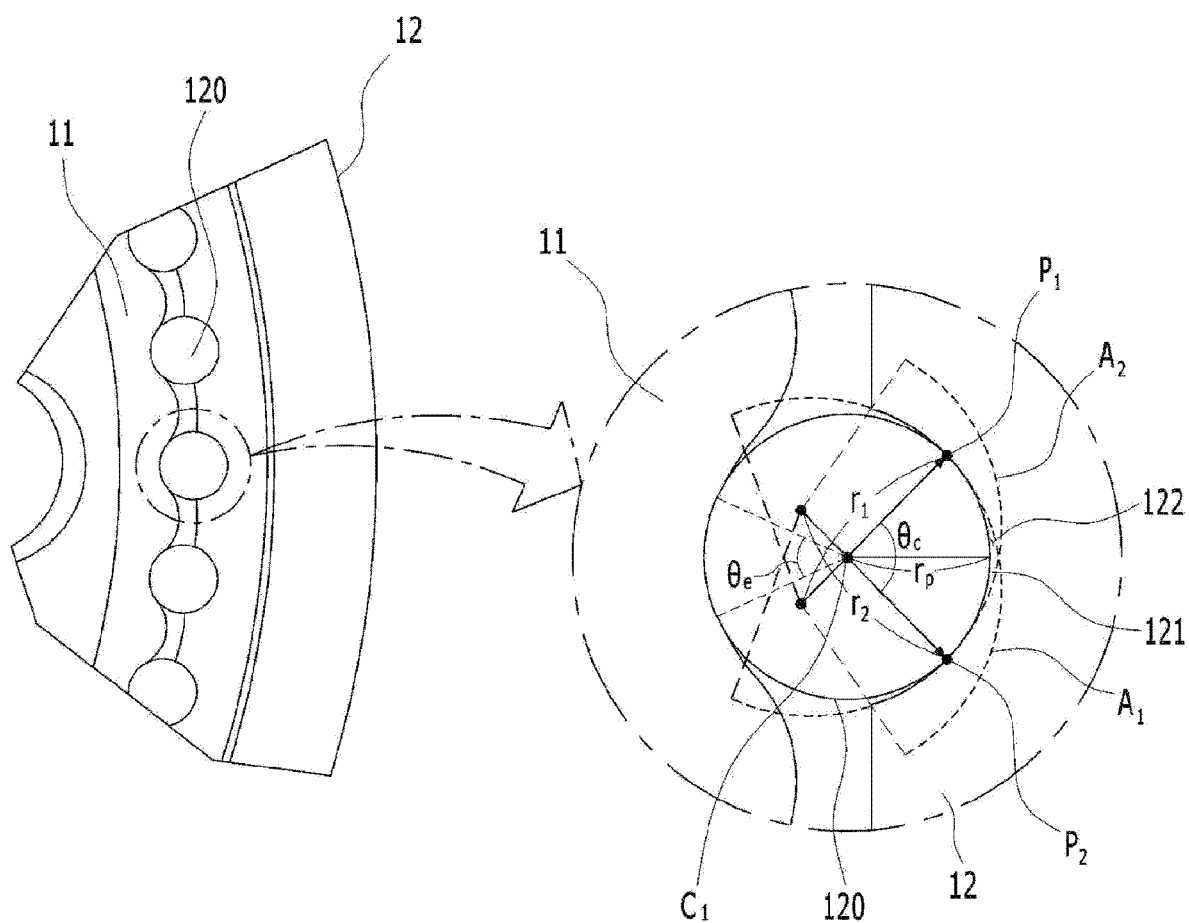
FIG. 4 is a view showing a portion cut from the gear module of FIG. 2.

Hereinafter, an explanation on the grooves 121 of the internal gear 12 will be given in detail with reference to FIG. 4. FIG. 4 is a view showing a portion cut from the gear module of FIG. 2.

Each groove 121 is formed concavely from an overlapping portion between a first circular sector $A_1$ having a first curvature radius $r_1$ larger than a curvature radius $r_p$ of each pin and a first circular arc coming into contact with one contact point $P_1$ and a second circular sector $A_2$ having a second curvature radius $r_2$ larger than the curvature radius $r_p$ of each pin and a second circular arc coming into contact with another contact point $P_2$. In this case, the first curvature radius $r_1$ passes through a center point $C_1$ of each pin and is thus connected to the contact point $P_1$, and the second curvature radius $r_2$ passes through the center point $C_1$ of each pin and is thus connected to the contact point $P_2$. Further, the first curvature radius $r_1$ and the second curvature radius $r_2$ have the same size as each other.

Figure 5A:
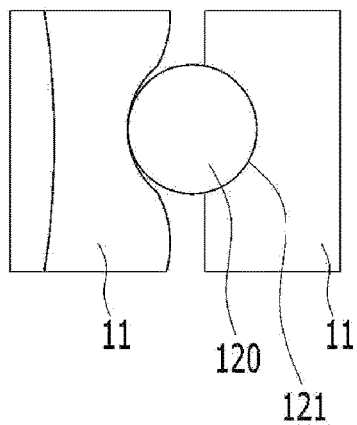
FIGS. 5A to 5C are views showing shapes of grooves according to sizes of a first curvature radius and a second curvature radius of FIG. 4.
Figure 5B:
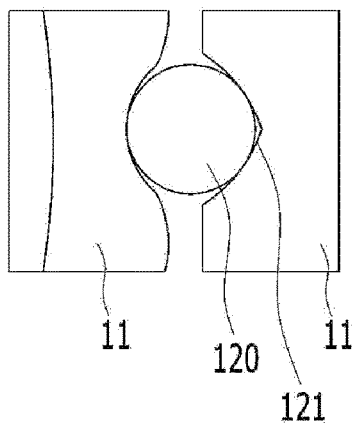
Figure 5C:
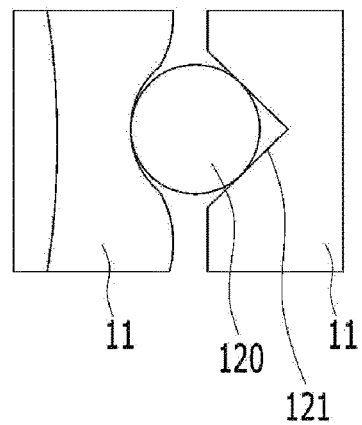

In this case, the first curvature radius $r_1$ and the second curvature radius $r_2$ are equal to or greater than the curvature radius $r_p$ of each pin. If the first curvature radius $r_1$ and the second curvature radius $r_2$ are equal to the curvature radius $r_p$ of each pin, the groove 121 has the shape of a semicircular curve, and contrarily, if the first curvature radius $r_1$ and the second curvature radius $r_2$ are greater than the curvature radius $r_p$ of each pin, the groove 121 has the shape of a gothic arc. If the first curvature radius $r_1$ and the second curvature radius $r_2$ are infinitely greater than the curvature radius $r_p$ of each pin, the groove 121 has the shape of a straight line. Accordingly, the groove 121 is formed to the shape of a curved or straight line (See FIGS. 5A to 5C).

Further, the gear module 10 is configured to allow an angle $\theta_c$ formed by two straight lines connecting the contact points $P_1$ and $P_2$ to the center point $C_1$ of the pin to be greater than or equal to an angle $\theta_e$ formed by two straight lines connecting boundary points of an effective contact range where the effective contact with the pin 120 is kept during one rotation of the external gear 11 to the center point $C_1$ of the pin.

According to the present invention, on the other hand, the contact points $P_1$ and $P_2$ are not specific points, but they are points just satisfying the above-mentioned conditions. Accordingly, they can be selected by a user.

Through the characteristics of such shape of the groove 121, the load of the pin 120 is distributed to thus improve durability of the pin 120, and as the pin 120 and the groove 121 have line contact with each other at given positions, they are relatively little influenced by surface roughness. According to the present invention, further, load or segment which inhibits rotation through incomplete contact between the pin 120 and the groove 121 can be in advance avoided.

As the gear module 10 has the grooves 121 as described above, a space portion 122 is formed between each groove 121 and the pin 120. In this case, a lubricant is accommodated into the space portion 122 to reduce a frictional force and frictional heat, and further, a lubricating film is formed in the space portion 122. Accordingly, an incidence rate of surface damage caused by the frictional heat can be lowered, and the fine particles generated by wear can be discharged to the outside.

Figure 6:
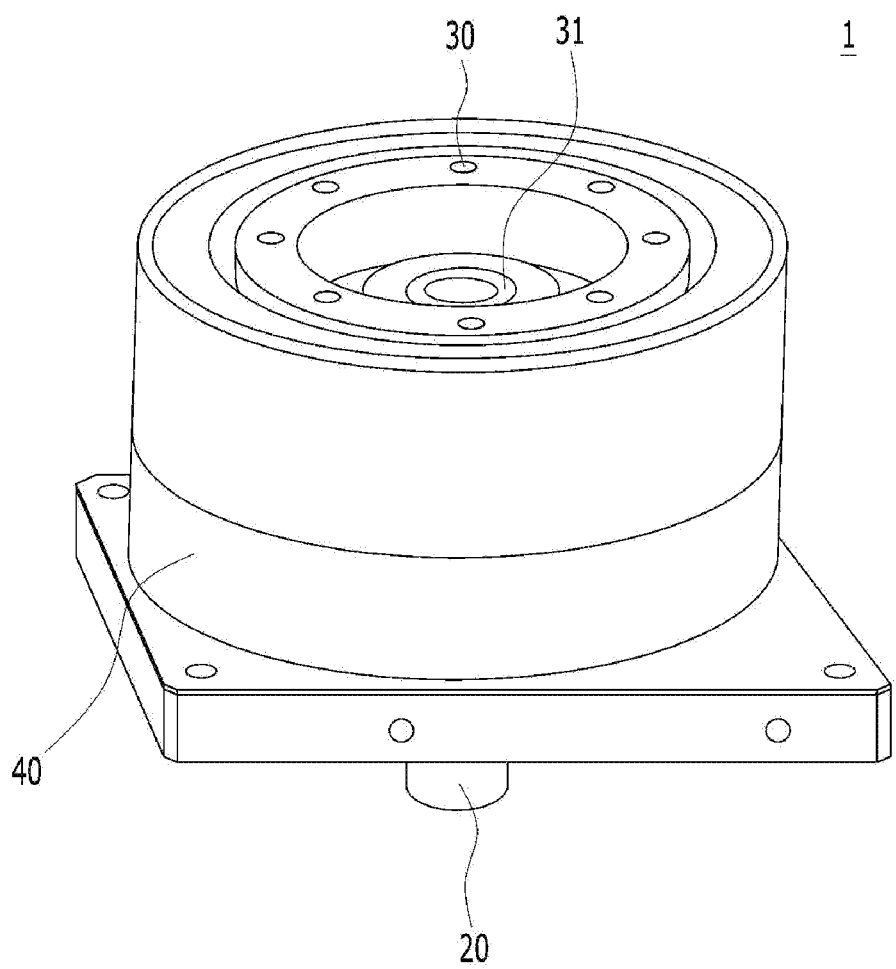
FIG. 6 is a perspective view showing a speed reducer to which the gear module according to the present invention is applied.
Figure 7:
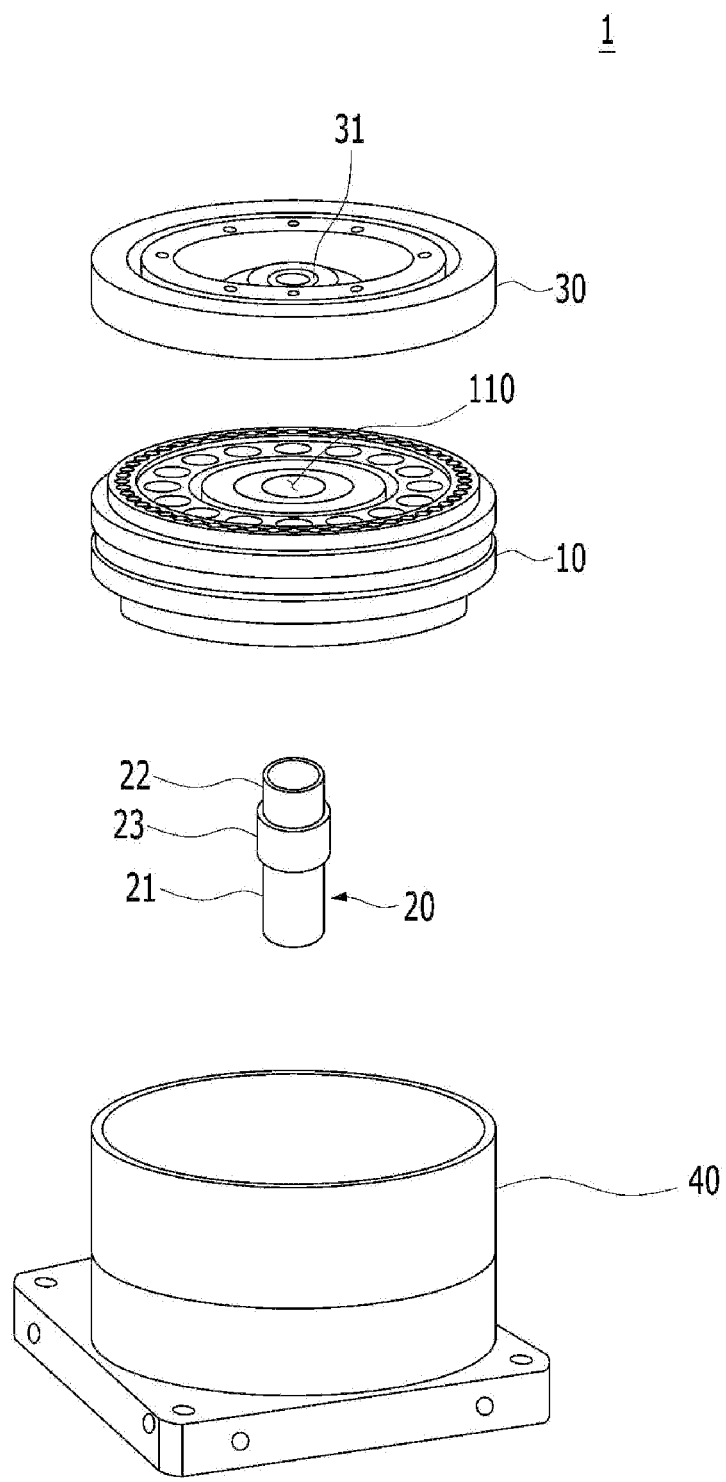
FIG. 7 is an exploded perspective view showing the speed reducer to which the gear module according to the present invention is applied.

FIG. 6 is a perspective view showing a speed reducer to which the gear module according to the present invention is applied, and FIG. 7 is an exploded perspective view showing the speed reducer to which the gear module according to the present invention is applied.

A speed reducer 1 is a device for controlling a rotational speed and includes an input part 20 having an input shaft 21 to which power is applied, the gear module 10 for reducing the power inputted thereto by a reduction ratio, an output part 30 having an output shaft 31 for outputting the power reduced, and a housing 40 for accommodating the input part 20, the gear module 10, and the output part 30 therein. In this case, the input shaft 21 is a rotational shaft of a power generating device (not shown) or is connected directly to the rotational shaft. Even though not shown, of course, a gear of the rotational shaft may engage with the input part 20.

In this case, the input part 20 includes the input shaft 21, the first eccentric body 22 coupled to the input shaft 21 in such a manner as to be eccentric by a given amount from the center of the input shaft 21 in the first direction, and the second eccentric body 23 coupled to the input shaft 21 in such a manner as to be eccentric by a given amount from the center of the input shaft 21 in the second direction opposite to the first direction.

Now, an explanation on the speed reduction principle of the speed reducer 1 will be briefly given. If the input shaft 21 rotates with the power received, first, the external gear 11 eccentrically rotates in the opposite direction to the rotating direction of the input shaft 21 and engages sequentially with the pins 120 coupled to the internal gear 12. If the input shaft 21 rotates once, in this case, the external gear 11 cannot move from a starting point by a difference between the number of teeth thereof and the number of pins, so that speed reduction can be performed.

FIG. 7 shows the internal gear 12 and the housing 40 as separate parts, but they can be provided as one part. In detail, grooves are formed along the inner peripheral surface of the housing 40 in such a manner as to locate pins therein.

On the other hand, the input part 20 and the output part 30 may be reversely located to thus provide a speed increaser.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The foregoing description of the embodiments of the invention has been presented for the purpose of illustration; it is not intended to be exhaustive or to limit the invention to the precise forms disclosed. For example, the parts expressed in a singular form may be dispersedly provided, and in the same manner as above, the parts dispersed may be combined with each other.

It is therefore intended that the scope of the invention be limited not by this detailed description, but rather by the claims appended hereto, and it should be understood that the invention covers all the modifications, equivalents, and replacements within the idea and technical scope of the invention.

MODE FOR INVENTION

Hereinafter, the embodiment of the present invention has been suggested in the best embodiment of the present invention.

INDUSTRIAL APPLICABILITY

The present invention relates to the gear module having the two-point contact internal gear that is applicable to a speed reducer or increaser and has repetition precision, thereby providing high industrial applicability.

The invention claimed is:

1. A gear module comprising:
   an external gear eccentrically rotating and having a plurality of teeth formed along an outer peripheral surface thereof; and
   an internal gear having a plurality of grooves formed along an inner peripheral surface thereof in such a manner as to allow pins to be located in the plurality of grooves and thus to come into contact with the external gear,
   wherein each groove and each pin come into contact with each other with two contact points, and each groove is formed concavely from an overlapping portion between a first circular sector having a first curvature radius $r_1$ larger than a curvature radius of each pin and a first circular arc coming into contact with one contact point and a second circular sector having a second curvature radius larger than the curvature radius of each pin and a second circular arc coming into contact with another contact point, the first curvature radius and the second curvature radius passing through a center point of each pin in such a manner as to be connected to the respective contact points and having the same size as each other.

2. The gear module according to claim 1, wherein an angle formed by two straight lines connecting the contact points to the center point of the pin is greater than or equal to an angle formed by two straight lines connecting boundary points of an effective contact range between the external gear and the pin to the center point of the pin.

3. The gear module according to claim 1, wherein each groove is formed to the shape of a curved or straight line.

4. The gear module according to claim 1, wherein through the formation of the groove, a space portion is formed between the pin and the groove, and the space portion has a lubricant accommodated thereinto.

5. The gear module according to claim 1, wherein the contact points and the angle formed by the two straight lines connecting the contact points to the center point of the pin are determined according to a user's selection.

* * * * *